United States Patent [19]
Yoshioka et al.

[11] Patent Number: 5,260,728
[45] Date of Patent: Nov. 9, 1993

[54] APPARATUS FOR REDUCING, ENLARGING AND PROJECTING IMAGE INFORMATION

[75] Inventors: Yoshio Yoshioka; Kouji Kuwabara, both of Hitachi; Makoto Yano, Mito; Kiyoshi Saito, Katsuta; Kiyoshi Okumura; Minoru Fujimoto, both of Hitachi, all of Japan

[73] Assignee: Hitachi, Ltd., Tokyo, Japan

[21] Appl. No.: 713,993

[22] Filed: Jun. 12, 1991

[30] Foreign Application Priority Data

Jun. 22, 1990 [JP] Japan .................................. 2-165043

[51] Int. Cl.⁵ .......................... G02F 1/13; G03B 21/28
[52] U.S. Cl. ........................................ 353/34; 353/20; 353/82; 359/40
[58] Field of Search ................ 353/20, 30, 31, 33, 353/34, 37, 81, 82, 122, DIG. 3; 359/40, 48, 63, 64, 83, 85, 496, 495, 494; 219/121.6, 121.76, 121.78, 121.79; 346/76 L

[56] References Cited

U.S. PATENT DOCUMENTS

| | | |
|---|---|---|
| 3,893,758 | 7/1975 | Hunzinger et al. .................. 353/20 |
| 3,961,334 | 6/1976 | Whitby et al. ........................ 353/20 |
| 4,345,258 | 8/1982 | Tsai et al. ............................. 353/20 |
| 4,707,584 | 11/1987 | Kimbara ......................... 219/121.76 |
| 4,723,077 | 2/1988 | Wu ........................................ 359/40 |
| 4,818,835 | 4/1989 | Kuwabara et al. ............... 219/121.6 |
| 5,028,121 | 7/1991 | Baur et al. ............................. 353/31 |
| 5,042,921 | 8/1991 | Sato et al. ............................. 359/63 |

FOREIGN PATENT DOCUMENTS 0039084  2/1990  Japan ..................... 359/40

Primary Examiner—William A. Cuchlinski, Jr.
Assistant Examiner—William C. Dowling
Attorney, Agent, or Firm—Antonelli, Terry, Stout & Kraus

[57] ABSTRACT

A light beam (30) including a random polarization and radiated from a light source, such as laser oscillator (6) is separated into P wave polarization light beam and S wave polarization light beam by a beam splitter 33. After modulated by image information representative of characters to be printed, both the P and S wave polarization beams are merged and the resultant light beam is projected on the surface of a workpiece for marking a pattern.

29 Claims, 12 Drawing Sheets

APPARATUS FOR REDUCING, ENLARGING AND PROJECTING IMAGE INFORMATION

BACKGROUND OF THE INVENTION

The present invention relates to an apparatus for reducing, enlarging and projecting image information suitable for securing a constant luminous intensity.

As an example of an apparatus for projecting light provided with image information in a reduced or enlarged form, there is a laser marker. The laser marker is used to mark a product name, control code, etc. on an object such as an IC by a laser beam.

In a masking type laser marker a laser beam is radiated onto the surface of an IC or the like through the mask on which marking information is formed for printing the marking information thereon. In changing the marking information of the mask type markers, it is necessary to exchange a metal mask having the required information bored therein, or a glass plate having information formed as an etching image thereon. Therefore, this type of masking marker is not economical, nor is convenient in respect to the mask control, manufacture, interchange, manufacturing cost, labor saving, etc.

On the other hand, there has also been developed a typewriter type marker, in which the characters, numerals, and patterns prepared in advance can be selected by operating an optical system to print them in desired positions. Nevertheless, this type of marker still has a drawback that the marker uses only the prepared patterns and characters, the optical system required for its operation are complicated, making its high-speed performance difficult.

As shown in Japanese Laid-open Patent Publication Hei 1-11088(1989) corresponding to U.S. Pat. No. 4,818,835, a liquid crystal type laser marker has been developed wherein marking information is formed on a liquid crystal mask through which laser beams is caused to pass to form an image on an object. The marking information can be displayed electronically as an liquid crystal image. Thus it is possible to save labors to manufacture, replace, and control masks as required in the case of the conventional masking markers, and there is an advantage that the expenditure for masks can significantly be reduced. As another example of image reduction and enlargement projectors related to the present invention, there is an image projector, such as a liquid crystal projection TV. This system is such that an image is formed on a liquid crystal element as in the case of the laser marker, and that by transmitting light through this liquid crystal element, image information is provided to the light for projecting the image. A white light source is used, and the light provided with the image information is projected onto a screen in an enlarged form by a projection lens. In a color image projector, a light from the light source is separated into the three prime colors, R, G, and B, and liquid crystal elements are respectively arranged in each of the light paths for these three prime colors. Then, the image information is given to each of the three color lights, and the lights are resynthesized.

As compared with the mask type markers, the conventional liquid crystal type marker has an advantage that the masking information can easily be replaced. This type of markers, however, still has drawbacks given below. In a liquid crystal type marker, an output beam from a pulse laser using an Nd:YAG rod is ordinarily employed for marking after having converted this output beam into a linearly polarized light by the use of a Brewster's window. If the frequency of the pulse oscillation is raised to speed up the marking, a temperature gradient is generated in the YAG rod due to the pumping energy of a flash lamp required therefor. Hence, an intensive tensile stress is exerted on the regions in the vicinity of the periphery of the cylindrical rod.

The increased pumping power causes the YAG rod to be deformed, resulting in a thermal lensing effect by which in turn the YAG rod causes the resonance system to be out of focus. However, the thermal lensing effect does not give any hindrance to the pulse pumping system such as a laser marker. The strain generated by the inner stress brings about a birefringence phenomenon having different refractive indices in the radial direction nr and in the peripheral direction nφ at an arbitrary point P. Since an image formed by a liquid crystal is a resultant image display which can be obtained by rotating the plane of polarization of the linearly polarized light output by the electrical field applied to the liquid crystal, it is required that the incident light is always a linearly polarized light which is maintained at a constant level. However, if a birefringence phenomenon is generated, elliptically polarized light is generated in the portion. As a result, the intensity distribution in the plane of the linear polarization is fluctuated, and an intensity distribution of the output, which is so-called a cross mode, appears. If such a phenomenon occurs, the laser beam intentionally generated is used only the portion showing the cross shape, and the marking is performed only partially.

For the marking on an IC, etc., the amount of information has increasingly become greater year after year due to the diversification of product name, such as ASIC (Application Specified IC), lot control, production control, etc. Therefore, the reduction of applicable luminous energy by a 40 to 50% is not desirable because the marking area becomes smaller than that of the conventional mask type marking. To increase the laser output is not economical because the power source and the YAG rod size must be made larger.

For the image projector, i.e., the liquid crystal projection TV, there has been proposed a system such that the light from the light source is separated by a beam splitter into two polarized light components, P wave and S wave, to obtain linearly polarized light, and only either one of them is used for the marking. In this case, the luminous energy is reduced almost by half, and a problem is encountered that a bright image cannot be obtained.

SUMMARY OF THE INVENTION

An object of the present invention is to prevent the reduction of luminous energy in an image reduction and enlargement projector in which image information is added to light to be project in a reduced or enlarged form.

Another object of the present invention is to provide a laser marker obtaining the same marking area as that of the conventional mask laser marker by use of a liquid crystal element even when the birefringence phenomenon appears in its YAG rod due to highly repeated pumping or high energy of the flash lamp.

Further object of the present invention is to provide an image projector thereby obtaining a bright image.

In order to achieve the first object an image reduction and enlargement projector is provided according to the present invention, wherein the projector has a light source for outputting a beam of randomly polarized light; means for separating the beams into two polarized light components, P wave and S wave; means for modulating the P wave and S wave to provide them with image information; means for resynthesizing the P wave and S wave provided with the image information; and means for projecting the light thus obtained by the resynthesization.

In order to achieve the second object, a laser marker is provided according to the present invention, wherein the marker has a laser oscillator for outputting a laser beam; a first beam splitter for separating the laser beam into P wave and S wave; an image formation means including at least two image formation elements arranged respectively for each of the light paths for the P wave and S wave to modulate the P wave and S wave to provide them with image information; a second beams splitter for resynthesizing the P wave and S wave provided with the image information; and image formation lens for enabling the light thus obtained by the resynthesization to form the image for the marking on an object.

In order to achieve the third object, an image projector is provided according to the present invention, wherein the projector has a light source for outputting a beam of randomly polarized light; a first beam splitter for separating the beam into both of the polarized light components, P wave and S wave; an image formation means including at least two image formation elements for modulating the P wave and S wave to provide them with image information; a second beam splitter for resynthesizing the P wave and S wave provided with the image information; and a projection lens for projecting the light thus resynthesized onto a screen.

The beam of randomly polarized light is separated into the polarized light components, P wave and S wave, which are perpendicular to each other, and after image information is provided, these components are resynthesized, making it possible to utilize both of the polarized light components, P wave and S wave, effectively. In the case of the laser light source, the distribution of the intensity in the plane of the linear polarization is not varied by the linearly polarized light obtained by the separation of the beam comprising the randomly polarized light into the polarized light components, P wave and S wave which are perpendicular to each other, even when the birefringence phenomenon appears in the YAG rod due to the highly repeated pumping or high energy of the flash lamp. Accordingly, there is not occurrence of the output intensity distribution of a cross mode. There is no luminous energy reduction such as encountered in conventional liquid crystal type laser markers and liquid crystal projection TVs. In a laser marker, it is possible to avoid decreasing the marking area as has been experienced in the conventional liquid crystal type laser markers at the time of a high-level output or highly repeated pumping, thus enabling the marking to be effectuated in approximately the same area as that of the conventional mask type laser markers. In the image projector, e.g., liquid crystal projection TV, it is possible to obtain a bright image because the luminous energy is not reduced by half.

DESCRIPTION OF THE PREFERRED EMBODIMENTS

Hereinafter, in conjunction with the accompanying drawings, the preferred embodiments of the present invention will be described.

At first, a first embodiment of the present invention will be described with reference to FIG. 1 to FIG. 11.

Figure 1:
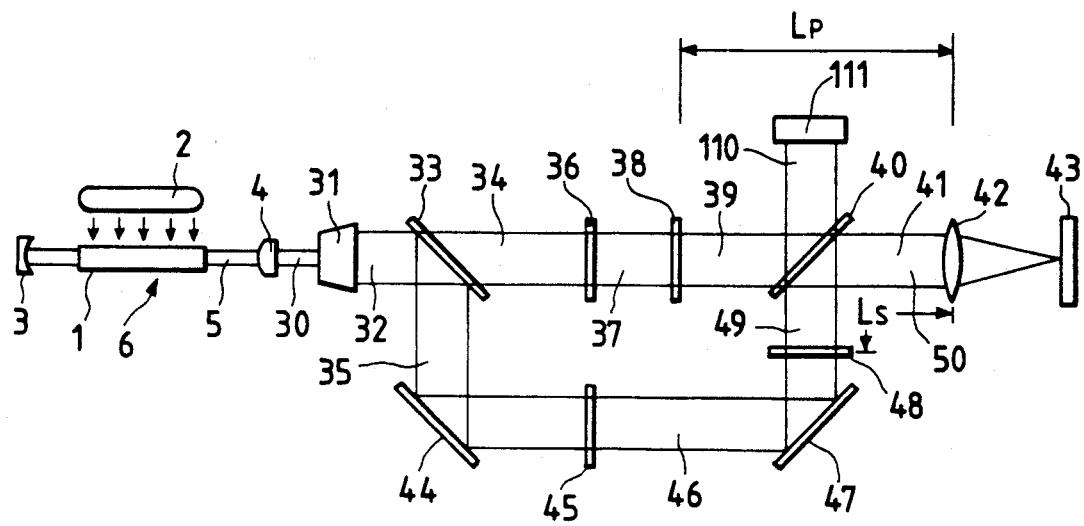
FIG. 1 is a schematic view showing the structure of a laser marker of an embodiment of the present invention.
Figure 2:
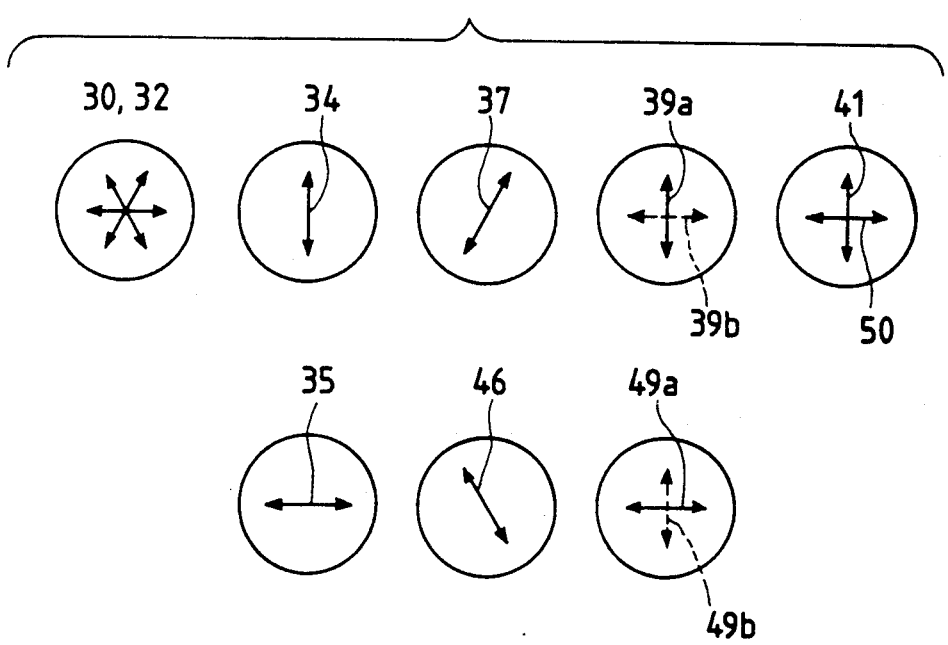
FIG. 2 is a view showing the direction of the polarization of the laser light on the optical path of the laser marker thereof.
Figure 3:
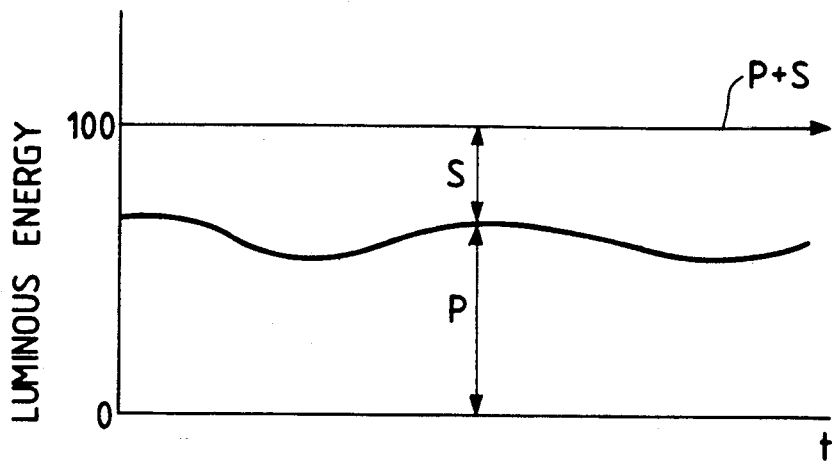
FIG. 3 is a view showing the time-wise changes in the intensities of the P wave, S wave, and its synthesized wave of the laser output of the randomly polarized light.

In FIG. 1 a Nd:YAG rod 1 of a laser oscillator is pumped by a flash lamp 2 to generate laser oscillation between a total reflection mirror 3 and an output mirror 4. In the oscillator 6, a laser beam 5 is output through the output mirror 4 as a randomly polarized light and becomes a beam 30. Subsequently passing through a beam expander 31, a beam 32 reaches a beam splitter 33 where the beam is separated into the linearly polarized light beams 34 and 35, i.e., P wave and S wave, the polarized light planes of which are perpendicular to each other. FIG. 2 is cross-sectional views showing the respective planes of such polarized light beams. The output light 30 and the beam 32 after the beam expansion, which are polarized at random in all directions as shown in FIG. 2, are separated by the beam splitter 33. The P wave 34 which advances straight becomes a linearly polarized light in the direction parallel to the plane of the drawing. The reflected beam 35 becomes the S wave which is perpendicular to the plane of the drawing crossing the P wave. The ratio of the P wave and S wave always fluctuates time-wise as shown in FIG. 3, but when the two waves are added, the intensity is constant.

Figure 4:
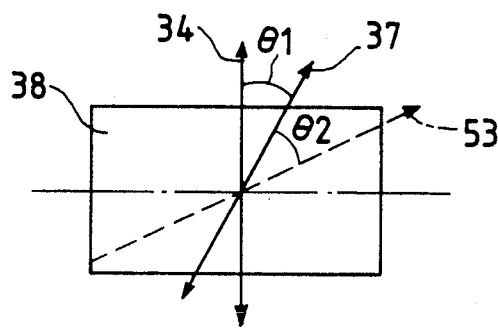
FIG. 4 and FIG. 5 are views showing the directions of the incident and outgoing lights of two liquid crystal elements used for the embodiment and the rubbing direction of the elements.
Figure 6:
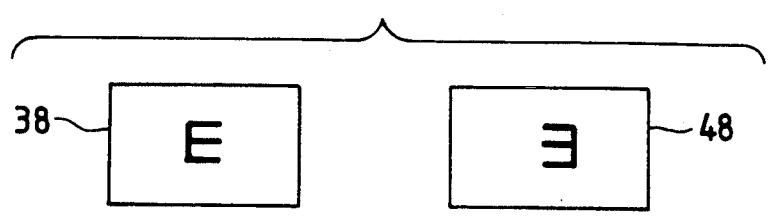
FIG. 6 is a view illustrating that the display of the two liquid crystal elements of the embodiment is mirror-image representation.

The beams 34 and 35 separated into the P wave and S wave advance along the respective paths, and at first, the deflection angle of the P wave is deflected by $\theta 1$ clockwise by a half-wave plate 36 as shown in FIG. 4. In other words, assuming that the angle of the linearly polarized light of the beams 34 in the direction of Y axis (vertical direction), the beams 37 passing through the half-wave plate 36 becomes a linearly polarized light with n inclination of $\theta 1$. This light is transmitted through the mask 38 of a liquid crystal element (hereinafter referred to as a liquid crystal element). On the liquid crystal element 38, an image such as shown in FIG. 6 is displayed. At this juncture, the light passing through the liquid crystal segments where the image is displayed is rotated by $\theta 1$ counterclockwise, and returns to a linearly polarized light beam 39a in the direction of y axis. The light passing through the liquid crystal segments where no image is displayed becomes a polarized light beam 39a in the direction of x axis (horizontal direction). The beam 39 comprising the beams 39a and 39b enters a beams splitter 40. The beam splitter 40 passes the P wave and reflects the S wave; thus the beams 39a passing through the segments of the liquid crystal 38 where the image is displayed is allowed to be transmitted and output as the P wave beams 41. The other beam 39b is reflected, and becomes a discarded beam 110.

Figure 5:
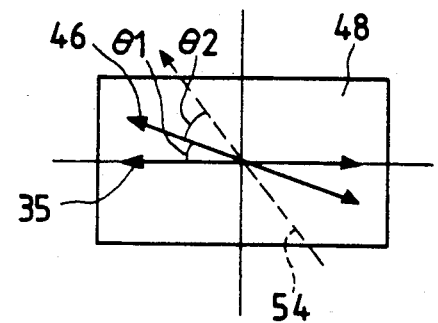

In the meantime, the S wave beam 35 separated by the beam splitter 33 is reflected by a mirror 44 to enter another half-wave plate 45, and becomes a linearly polarized light beam 46 which is rotated clockwise by $\theta 1$ to the horizontal direction of x axis as shown in FIG. 5. This light is reflected by a mirror 47 to enter the beam splitter 40 after passing through a second liquid crystal element 48.

On the liquid crystal element 48, when viewed from the direction in which the light advances as shown in FIG. 6, mirror-images (right-to-left symmetry) of the liquid crystal 38 are displayed. Then, the light passing through the liquid crystal segments where the image is displayed returns to the linearly polarized light in the horizontal direction as designated by numeral 49a in FIG. 2, i.e., returns to the S wave, while the light passing through the non-image displaying segments becomes a light having the polarization direction in the vertical direction designated by numeral 49b. Therefore, at the beam splitter 40, the S wave beam 49a passing through the image displaying segments of the liquid crystal 48 is reflected to become the beam 50 which is combined with the beam 41 described before, while the light 49b passing through the non-image displaying segments becomes the discarded beam 110 which is directed upwards.

As the above describes, the light 41 written by the P wave and the light 50 written by the S wave are combined and become a light having an intensity which does not vary time-wise, to form an image on a marking object 43 through the lens 42. In this respect, the beams 41 and 50 are the lights having the polarized components which are perpendicular to each other as shown in FIG. 2.

Figure 7:
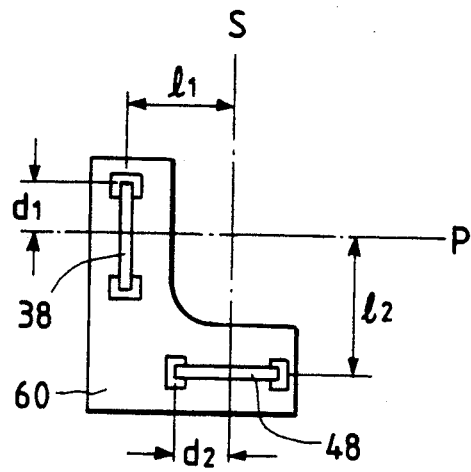
FIG. 7 is a view showing a specific arrangement of two liquid crystal elements.

In the above description, if the liquid crystal shown in FIG. 6 and FIG. 7 is a rectangle in shape, it is necessary to incline the incident lights of the P wave and S wave by $\theta 1$ respectively from the vertical and horizontal axes. To this end, the oriented film rubbing direction of the liquid crystal element related to the so-called polarized light direction is further rotated by $\theta 2$ as indicated by numerals 53 and 54 with respect to the incident lights 37 and 46. When rectangle liquid crystal elements are employed, it is necessary to prepare two liquid crystal masks 38 and 48 with different rubbing directions. If, however, the liquid crystal elements are squares in shape, it is only required to interchange x and y axes, and there is no need of the preparation of two different kinds of liquid crystal elements.

FIG. 7 illustrates the arrangement of the two liquid elements 38 and 48. These elements are so arranged as to be perpendicular to each other. When two images are formed by a lens 42, it is necessary to superpose them accurately. Therefore, the liquid crystal elements 38 and 48 are arranged to enable the fine adjustments of the angles, the vertical and horizontal positions thereof. In order to make such adjustments easier, it is desirable to install the two liquid crystal elements 38 and 48 on an integrated base 60. It is further desirable to establish that the distances from the two liquid crystal elements 38 and 48 to the lens 42, Lp and Ls, are identical to each other to form an image of the P and S waves on the marking object 43. The adjustment is made to establish the distances from the liquid crystal elements 38 and 48 to the crossing point of the center lines thereof, L1 and L2, almost identical to each other. The beam splitter 40 is arranged at the crossing point of the center lines thereof.

Figure 8:
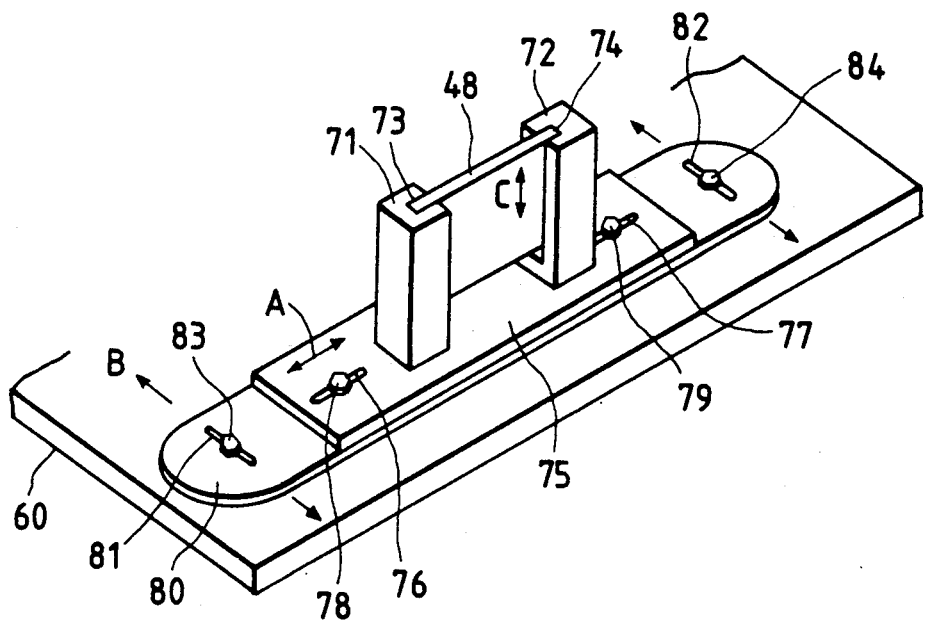
FIG. 8 is a view showing the fine positional adjustment mechanism for the liquid crystal elements.

FIG. 8 illustrates an example of the mechanisms for the fine positional adjustment of the liquid crystal elements 38 and 48, in which only one for the liquid crystal element 48 is shown. The liquid crystal element 48 is inserted into the grooves 73 and 74 of the stand 71 and 72 to enable its height adjustment in vertical direction C. The stands 71 and 72 are installed on an upper base 75. The stands 71 and 72 are installed on an upper base 75. The upper base 75 is mounted on a lower base 80 by elongated holes 76 and 77 and bolts 78 and 79 in such a manner that the positional adjustment can be made in the direction indicated by arrow A. The lower base 80 is mounted on a base 60 by elongated holes 81 and 82 and bolts 83 and 84 to enable the adjustment in the direction indicated by arrow B. In this way, the positions of the liquid crystal element 48 can be adjusted in direction the A, B, and C in order to superpose accurately the image information given by the two liquid elements 38 and 48. The distances L1 and L2 from the liquid crystal elements 38 and 48 to the crossing point of the center lines thereof can be adjusted to be equal to each other.

Figure 9:
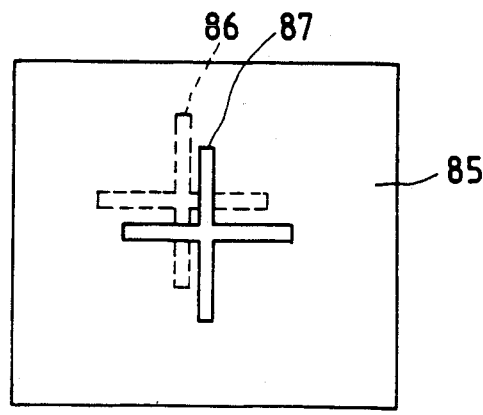
FIG. 9 is a view showing the method of positioning the displays of the liquid crystal elements by utilizing the discarded beam.

In FIG. 1, the discarded beam 110 reflected by or passing through the beam splitter 40 may be detected by a detector 111 in order that the positions of the liquid crystal elements 38 and 48 are also adjusted. An example in this case is illustrated in FIG. 9. FIG. 9 shows a method in which the discarded beam which is not used for marking is irradiated onto a photosensitive sheet 85 and the beam generates a color by a laser beam to perform the positioning of the two liquid crystal elements 38 and 48. In other words, a pattern suited for the positional adjustment, such as a cross, is displayed on the liquid crystal elements 38 and 48. If there is a shift between the positions of both liquid crystal elements, the cross patterns are not in the same position when projected as indicated by numerals 86 and 87. Then the positions can be adjusted so as to match with each other. The discarded beam does not pass any optical system for reduction, and as it is possible to see the cross patterns in a larger size, the adjustment can be performed with ease. If the photosensitive sheet 85 is replaced with a sensor, such as a CCD sensor, an electronic means for adjusting the superposition condition of the two images may be provided without any visual adjustment. In addition, using this discarded beam, it is possible to monitor the shift of the positions, etc. caused during a long-hour operation while the marking is being performed.

Figure 10:
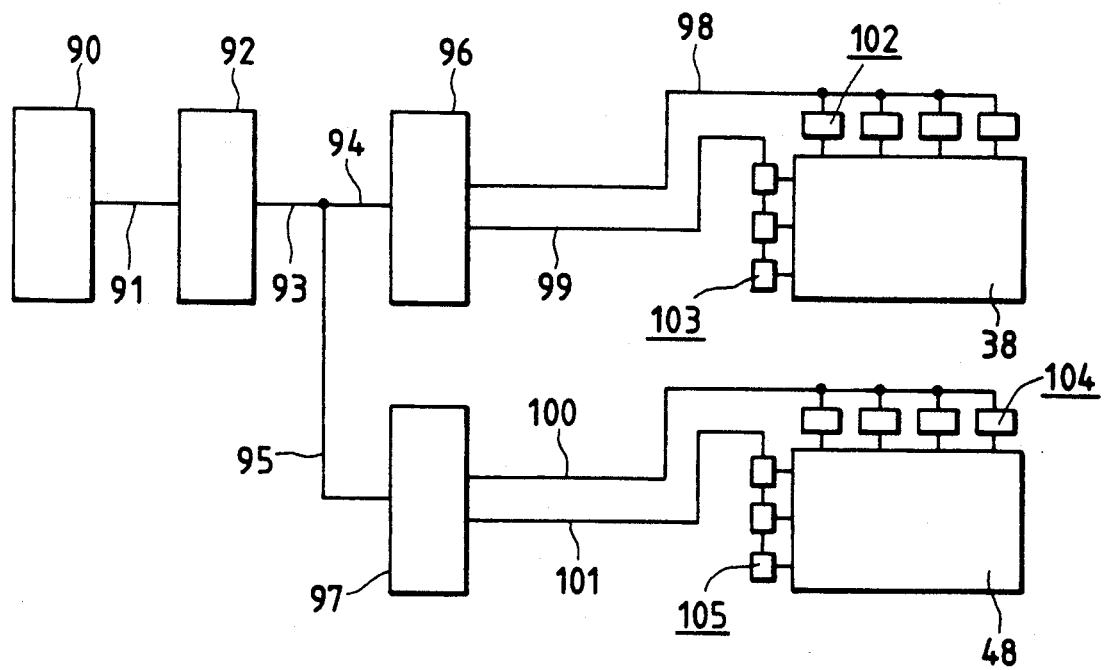
FIG. 10 is a view showing a system for supplying the image information to the two liquid crystal elements.

In the case of the present embodiment, it is necessary to display the same marking information on the two liquid crystal element 38 and 48. As shown in FIG. 10, the image information is preferably provided from a common signal source. FIG. 10 is a view illustrating the image information supply system for the two liquid crystal elements 38 and 48. The image information is edited by a personal computer 90 to be transmitted to a controlling microcomputer 92 through a signal line 91 for storage. This information is transferred to liquid crystal controllers 96 and 97 through signal lines 93, 94, and 95 in accordance with the instruction by the microcomputer 92, and is further transferred to drivers 102, 103, and 104, 105 for driving the liquid crystal elements 38 and 48 through signal lines 98, 99, and 100, 101. Thus, the information required for marking is fetched from the storage of the controlling microcomputer 92, and the same signal is provided to the two liquid crystal controllers 96 and 97 by the signal lines 94 and 95 through the signal line 93. Hence, there is no possibility that the two liquid crystal elements display any incorrect information.

As described before, it is necessary to display on the liquid crystal elements 38 and 48 an image and the mirror-image thereof as shown in FIG. 6. This type of display is possible both by a mechanical method and an electronic method. In the case of a mechanical method, the arrangement should be made to enable exactly the same images to be displayed on the two liquid crystal elements 38 and 48, and just install one of the liquid crystal elements reversely. In this case, the rubbing direction of the liquid crystal element must be taken into consideration so that the light passing through the image displaying segments of the liquid crystal element is a polarized light in the horizontal or vertical direction. In the case of electronic method, the signal representing the reversed coordinate position of the liquid crystal element in the x direction must be transferred to the liquid crystal controllers 96 and 97 by the controlling microcomputer 92 shown in FIG. 10 to make the display itself by a mirror-image one.

Although in conjunction with FIG. 8 there was described an example of the fine positional adjustment mechanism to superpose the two images accurately when the modulated information of the P wave and S wave is resynthesized, it may also be possible to do this electronically by shifting at least one of the displays of the liquid crystal elements 38 and 48 totally on the liquid crystal dots.

Figure 11:
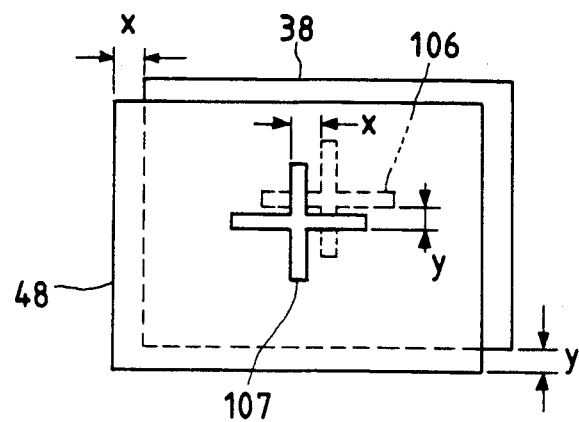
FIG. 11 is a view showing the method of adjusting the shifted images of the two liquid crystal elements.

FIG. 11 illustrates a method for electronically correcting the shift of the images of the two liquid crystal elements 38 and 48. If the two liquid crystal elements 38 and 48 are shifted by x vertically, and by y horizontally, as shown in FIG. 11, the same cross patterns 106 and 107 are also shifted. However, while the shift of the liquid crystal elements, x and y, remain unchanged, it is possible to match the two cross patterns together by shifting the position of the liquid crystal dot display of the cross pattern 106 by x and y towards the lower left side. This method is suitable for the correction of the shift which is an integer multiple of the intervals between the liquid crystal dots. To shift the dot positions, the signal to be transmitted to one of the two liquid crystal elements 38 and 48 from the controlling microcomputer 92 shown in FIG. 10 through the liquid crystal controllers 96 and 97 must be shifted by the number of dots for the correction required.

This method provides a fine adjustment means for the positional shift of the liquid crystal elements in operation without changing the position of the liquid crystal elements, this contributing effectively to the non-stop operation of a marker.

The above description has been made of a basic embodiment, and the essence thereof lies in that both P wave and S wave are used; through two image formation means utilizing the polarization rotation phenomenon of the liquid crystal elements, image information is provided to each of them; and subsequently, these waves are resynthesized. The laser light source is fundamentally a randomly polarized light source. However, even when the light is linearly polarized one in which a cross mode may appear, beams of such light are usable in place of the P wave and S wave if only the beams whose planes of polarization are perpendicular to each other can complement the portion other than the cross mode portion.

It is possible to modify the arrangement of light paths and liquid crystal elements in many ways by using mirrors. It is also possible to choose the location of the beam expander in the light path freely, and to expand the beam into an elliptic beam to match a liquid crystal mask. The half-wave plates are preferably set before the liquid crystal elements in the light paths because the arrangement is so made that the longitudinal direction of the liquid crystal element is horizontal, but if the liquid crystal elements are slantly positioned, the plates can be located in positions after the liquid crystal elements. What is important is that the polarized light directions are appropriate ones so that the P wave and S wave can be separated reliably for the axis of the beam splitter 40 for synthesization.

Further, the angle $\theta 1$ of the light incident on the liquid crystal element depends on the so-called twist angle of the liquid crystal element. The rubbing direction depends on the design of the elements.

While the description was made for Nd:YAG as the laser light source, the source may be of some other solid-state material or of a gas laser. The effect is good as a countermeasure when the birefringence is generated, and even when such a phenomenon appears, this source can be utilized in the case where no linearly polarized light output is obtainable by a laser light source.

Subsequently, in conjunction with the accompanying drawings, some other embodiments will be described including those embodiments to which the above-mentioned variations are applied.

Figure 12:
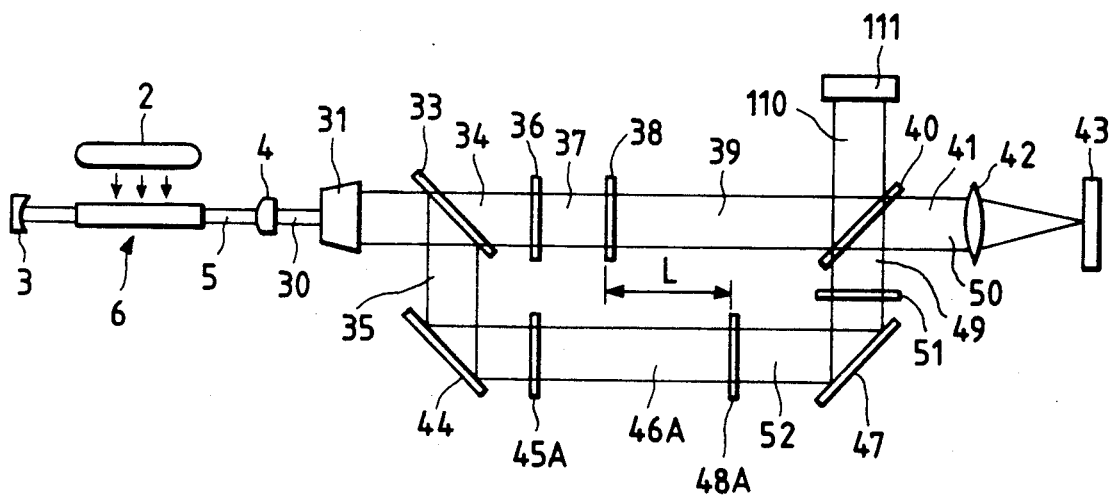
FIG. 12 is a view showing the structure of a laser marker of another embodiment of the present invention.

FIG. 12 illustrates a first one of those embodiments. What differs from the embodiment shown in FIG. 1 is that the liquid crystal element 48A arranged in the light path of the S wave is inserted on the upstream side of the mirror 47, and another half-wave plate 51 is inserted between the mirror 47 and the beam splitter 40. In this respect, the half-wave plate 51 can be inserted between the liquid crystal element 48A and the mirror 47.

Figure 13:
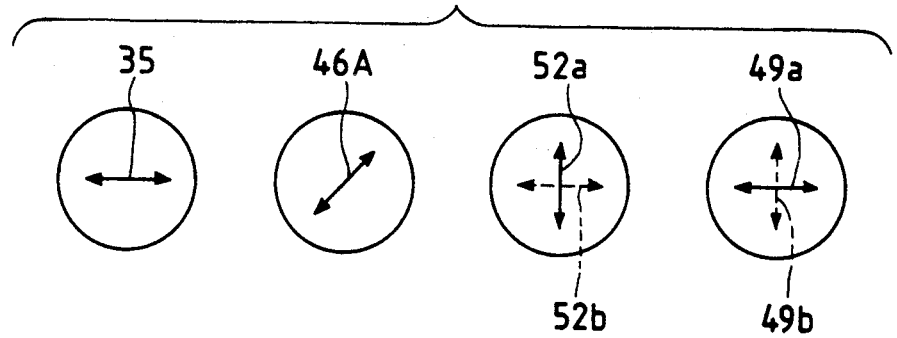
FIG. 13 is a view showing the direction of polarization of the laser light on the optical path of the laser marker thereof.
Figure 14:
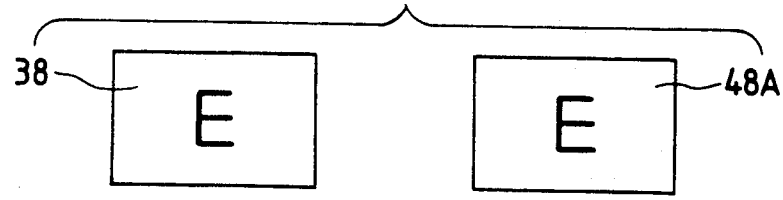
FIG. 14 is a view illustrating that the displays of the two liquid crystal elements are exactly the same.

In the embodiment, the polarized light plane of the S wave is rotated as indicated by numeral 46A after passing through the half-wave plate 45A as shown in FIG. 13. This is necessary in order to allow the plane of polarization of the S wave to be the sam as that of the light 37 of the P wave which passes through the beam splitter 33. Thus, the light beams 37 and 46A having exactly the same polarized light planes enter the two liquid crystal elements 38 and 48A. As a result, it is possible to employ exactly the same liquid crystal elements, i.e., those having the same rubbing directions, yet the image information is not mirror-image one as shown in FIG. 14. Then, the light beams 52a and 52b modulated by the liquid crystal element 48A return to the S wave and P wave by another half-wave plate 51 as designated by numerals 49a and 49b in FIG. 13. Accordingly, the light beams incident on the beam splitter 40 are in the same condition as in the case of the embodiment shown in FIG. 1.

In the embodiment, the two liquid crystal elements 38 and 48A are not arranged at right angles but in parallel and the positions thereof are shifted by L in order to make the distances between the elements and the lens 42 almost equal. However, if an image synthesized by the lens 42 is acceptable, the two liquid crystal elements 38 and 48A may be arranged on the same plane.

In the embodiment, only one kind of liquid crystal element is used. There is an advantage that the application of the embodiment is economical. There is a further advantage that the control thereof is easier because the image information is the same.

Figure 15:
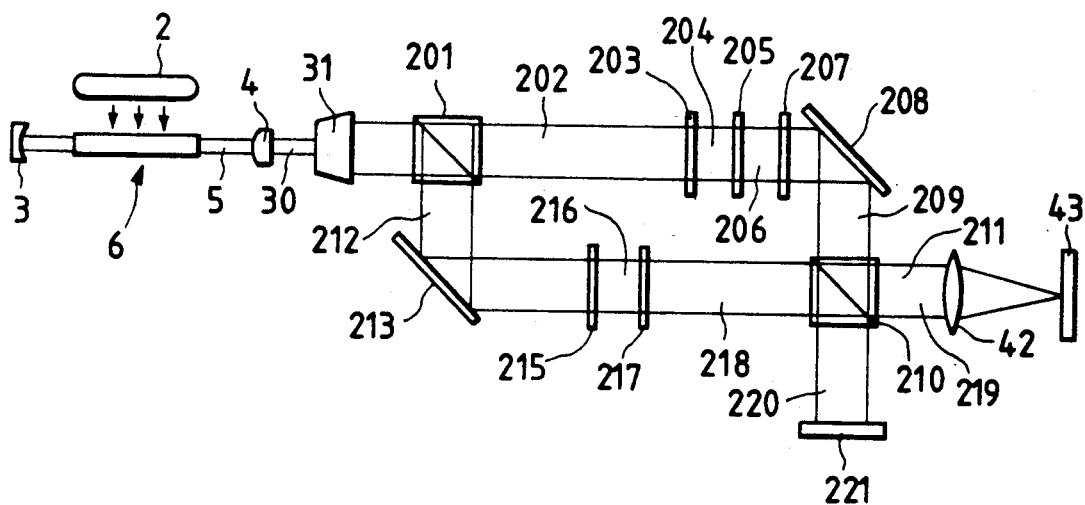
FIG. 15 is a view showing the structure of a laser marker of still another embodiment of the present invention.

FIG. 15 illustrates still another embodiment. What differs in this embodiment from the embodiment shown in FIG. 1 is that the flat type beat splitters 33 and 40 are replaced with cubic type beam splitters 201 and 210 while a mirror 208 is provided in the light path of the P wave to make the light paths of the P wave and S wave equal.

Figure 16:
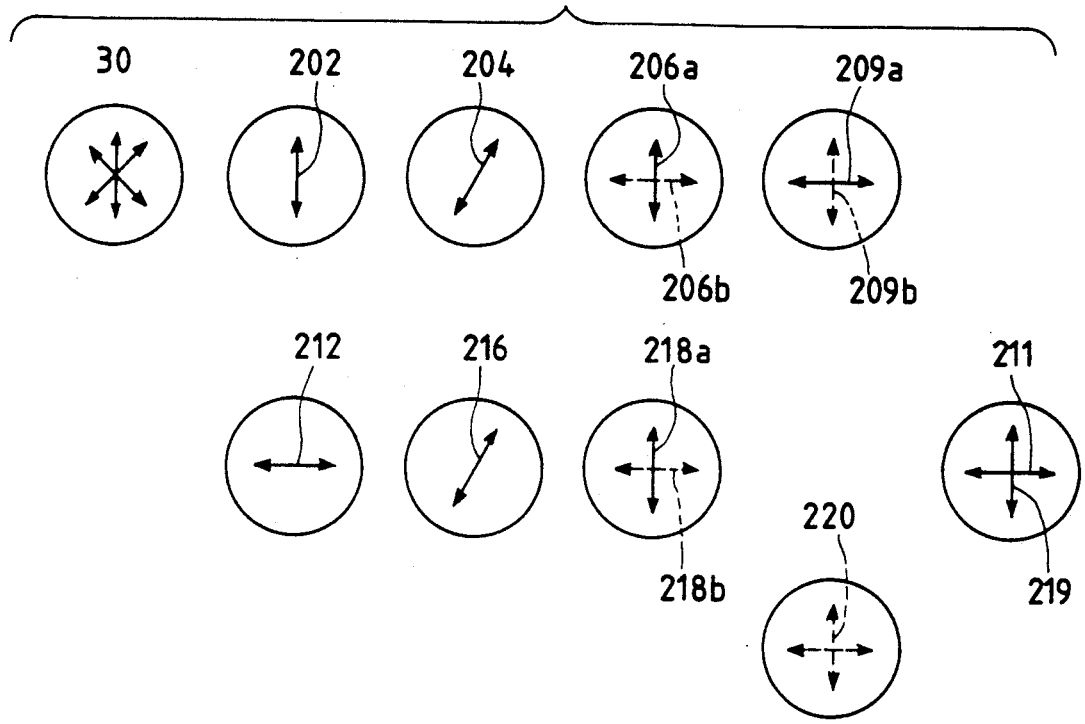
FIG. 16 is a view showing the direction of polarization of the laser light on the optical path of the laser marker thereof.

In the embodiment, the plane of polarization of the light beam 202 of the P wave passing through the cubic type beam splitter 201 is rotated as shown by numeral 204 in FIG. 16 by a half-wave plate, and the light of the marking information portion is returned by the liquid crystal element 205 to the P wave as designated by numeral 206a. This light is made by the half-wave plate 207 be the light 209a of the S wave perpendicular thereto and is reflected by a mirror 208. Then, this light is further reflected by a cubic type beam splitter 210 as a light beam 211 incident to a lens 42. On the other hand, the light beam 212 of the S wave separated by the beam splitter 201 is reflected by the mirror 213 and subsequently, its polarized light plane is rotated by the half-wave plate 215 as shown by numeral 216 in FIG. 16 to cause the plane of polarization to be the same as that of the light 204 of the P wave route. After that, the light modulated by the marking information portion of the liquid crystal element 217 is made to be the same P wave as the light 206a in the P wave route as designated by numeral 218a. This light 218a passes the beam splitter 210 and becomes a light beam 219 incident on the lens 42.

The light 206b which passes the remaining portion of the liquid crystal element 205 is returned to the P wave by the half-wave plate 207 and becomes a discarded beam 220 including the so-called negative image, which is a complementary information for the marking information, by the beam splitter 210 together with the light 218b which passes the remaining portion of the liquid crystal element 215; thus entering a beam dump 221.

In the embodiment, since the lengths of the optical paths of the P wave and S wave after initially separated are the same, there is an effect that the resynthesization of the image by the two liquid crystal elements is accurately performed even if the beam diverges.

Next, an embodiment with the omission of the half-wave plates will be described.

Figure 17:
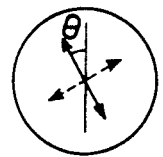
FIG. 17 is a view showing the direction of polarization of the light path using the half-wave plate.
Figure 18:
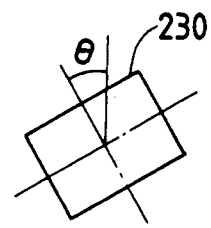
FIG. 18 is a view showing the direction in which the beam splitter is arranged at that time.

In each of the above embodiments, the angle of the polarized light plane is adjusted by the half-wave plate, and this is effective to arrange the beam splitter for synthesizing the P wave and S wave and liquid crystal elements horizontally in the plane of the drawing. Then, the description has been made of the arrangement of the half-wave plate to explain that if the liquid crystal elements are slantly arranged, the half-wave plates may be arranged on the downstream side of the liquid crystal elements. Nevertheless, it is still possible to omit the half-wave plates completely. In such a case, the arrangement should be made to allow the two liquid crystal elements to be inclined to the horizontal plane, and at the same time, the beam splitter for the resynthesization should be inclined by a degree $\theta$ while aligned with the axis of the modulated light as shown in FIG. 18 because the light modulated by the liquid crystal element has a polarized light plane such as shown in FIG. 17.

The description will be made of an embodiment in which one of the half-wave plates employed in the embodiments show in FIG. 12 and FIG. 15, i.e., the half-wave plates 51 and 207 respectively, is omitted.

In the embodiments shown in FIG. 12 and FIG. 15, the half-wave plates 51 and 207 are used for separating the light incident on the beam splitter into the P wave and S wave in order to enable the beam splitters 40 and 210 to synthesize the lights modulated by the two sets of liquid crystal elements 38, 48A and 205, 217. However if two liquid crystal elements are employed for displaying two kinds of images in terms of so-called photographic negative and positive, one half-wave plate can be omitted.

Figure 19:
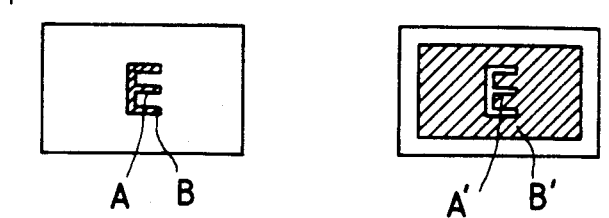
FIG. 19 is a view showing the state where the positive and negative images are formed on the two liquid crystal elements.
Figure 20:
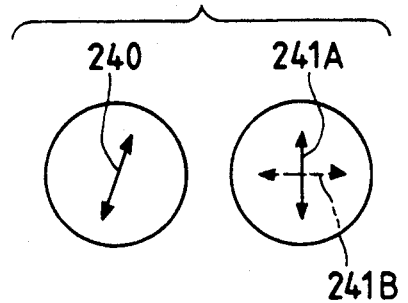
FIG. 20 to FIG. 22 are views showing the directions polarization in the respective light paths in the case thereof.
Figure 21:
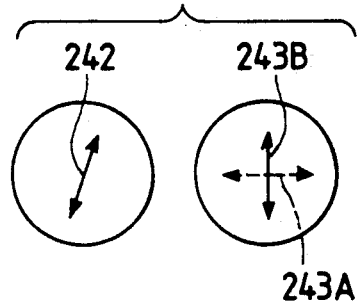
Figure 22:
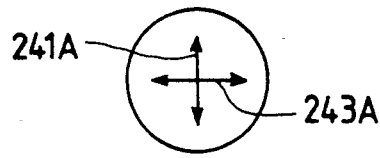

FIG. 19 illustrates the display of character information E in a positive form (on the left side) and a negative form (on the right side). At this juncture, if the polarized light plane of the light incident on each of the liquid crystal elements is established by the half-wave plate in the same direction as designated by numeral 240 in FIG. 20 and numeral 242 in FIG. 21, the positive image has the polarized direction 241A of the P wave in the portion A in the character E, and the portion B other than the character portion becomes the S wave with a plane of polarization in a direction such as designated by numeral 241B. Therefore, if this passes through the beam splitter for resynthesization, the image of the light 241A of the P wave in FIG. 12, for example, becomes the light 41 incident on the lens 42 as it is. Subsequently, the S wave which passes the other optical path is established by the half-wave plate in the same polarized light direction 242 as that of the P wave direction, and then passes the liquid crystal elements in which a negative image is formed. As a result, the light of the portion A' in the character E in the negative becomes the S wave 243A in FIG. 21 while the light of the background portion B' other than the character portion becomes the P wave 243B polarized in the vertical direction. Consequently, when passing through the beam splitter 40, the S wave component 243A is reflected to become a light 50 incident on the lens 42. This is a point on the character E having the polarized light direction 243A in FIG. 22. In other words, the character portion E of the negative image is reversed to be superposed on the positive character written by the P wave.

As a specific structure of the embodiment, a circuit for inverting signals is incorporated to cause the two liquid crystal elements to display a negative image and a positive image respectively.

Figure 23:
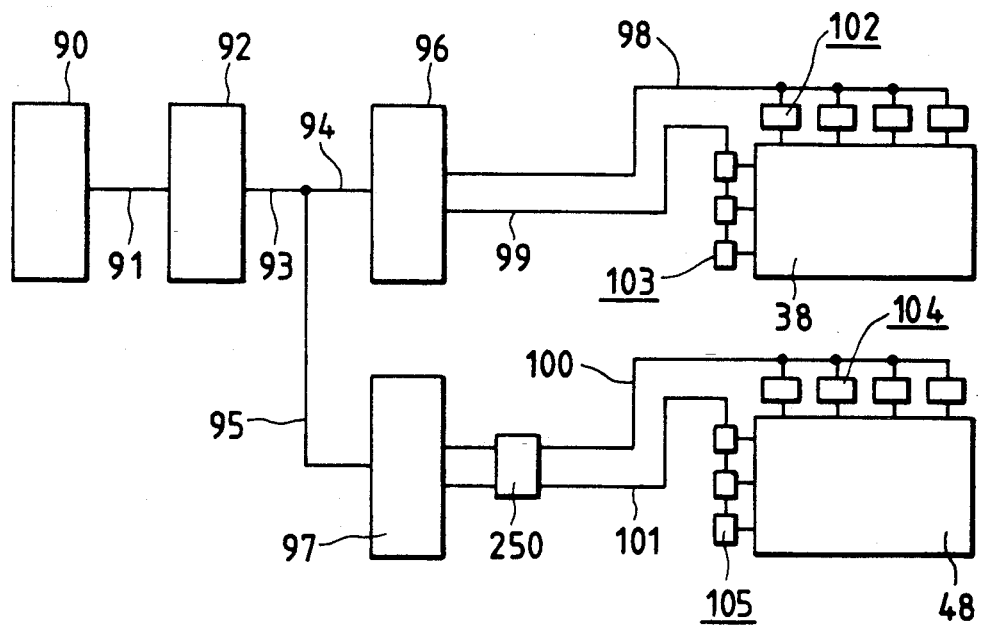
FIG. 23 is a view showing a system for supplying the image information to the two liquid crystal elements in the case thereof.

The structure show in FIG. 10 is so modified that when either the negative information or the positive information is transmitted from the personal computer 90 and the other is transmitted from the controlling microcomputer 92 to the liquid crystal controllers 96, 97, either of the negative and positive information is transmitted through a data inverting circuit. An example of such modification is shown in FIG. 23. In FIG. 23, a signal inverting circuit 250 is inserted between the signal lines 100 and 101 connecting one of the liquid crystal controllers 97 and the drivers 104 and 105 for driving the liquid crystal 48.

In this respect, instead of inserting the signal inverting circuit as described above, the negative information and the positive information are both transmitted by the personal computer 90 to the memory of the controling microcomputer 92. Then, the respective information may be provided to the liquid crystal controllers 96 and 97 after the stored information has been separated accordingly. However, the former case is high in reliability against an error such as to display incorrect data by mistake.

As set forth above, according to the embodiment which enables the two liquid crystal elements to display the negative image and the positive image, one of the half-wave plates can be omitted with an economical effect.

In conjunction with FIG. 24 and FIG. 25, still another embodiment of the present invention will be described.

Figure 24:
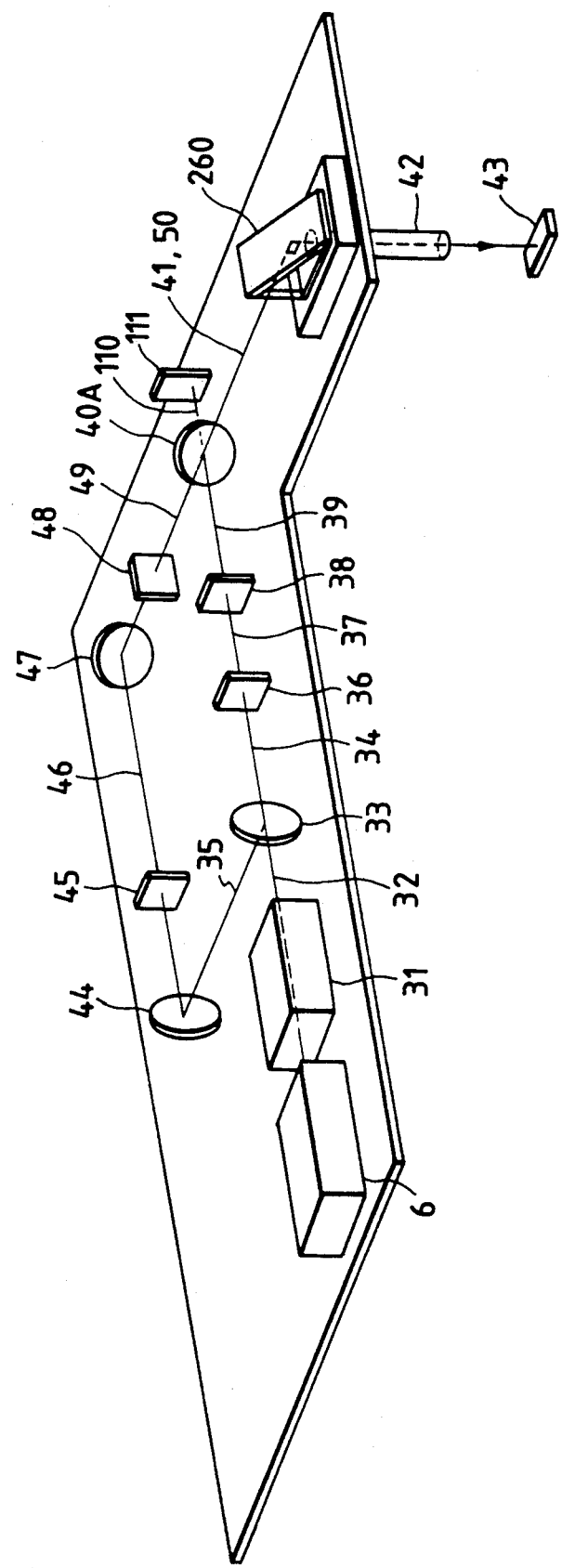
FIG. 24 and FIG. 25 are perspective views showing the structure of a laser marker of still another embodiment of the present invention.

FIG. 24 is a perspective view showing a partially modified embodiment shown in FIG. 1. In FIG. 24, the same members are designated by the same symbols. The beam splitter 40A is set to reflect the light with a printing information passing through the liquid crystal mask 38 and transmit the discarded light, and to transmit the light with a printing information passing through the liquid crystal mask 48 and reflect the discarded light. The light with the printing information 41 and 50 synthesized by the beam splitter 40A passes through a reflection mirror 260 and a lens 42 to form an image on the surface of an object 43 for marking.

Figure 25:
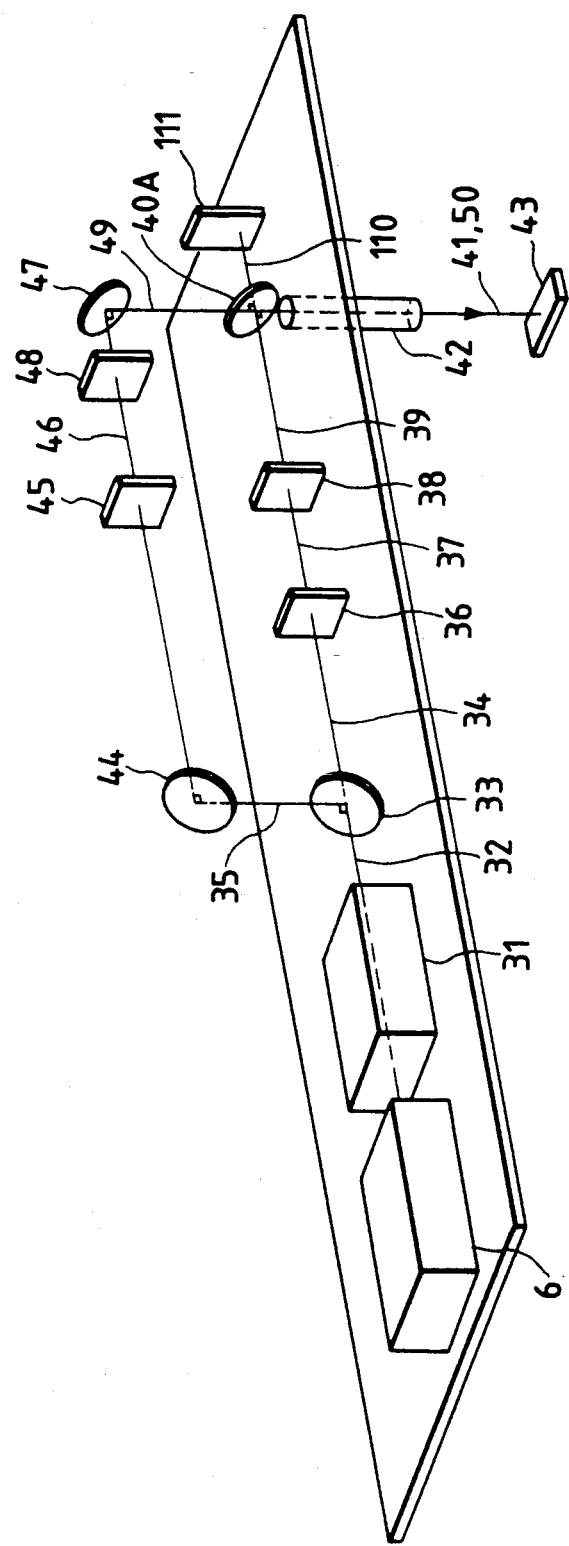

FIG. 25 is a perspective view showing an example of variations of the embodiment shown in FIG. 24. Here, what differs from the embodiment shown in FIG. 24 is that the processing optical system for the P wave and S wave is of a double-deck structure.

The above description has been made of the embodiments in which the present invention is applied to a laser marker. Subsequently, in conjunction with FIG. 26 and FIG. 27, the embodiments in which the present invention is applied to a liquid crystal projection TV will be described.

Figure 26:
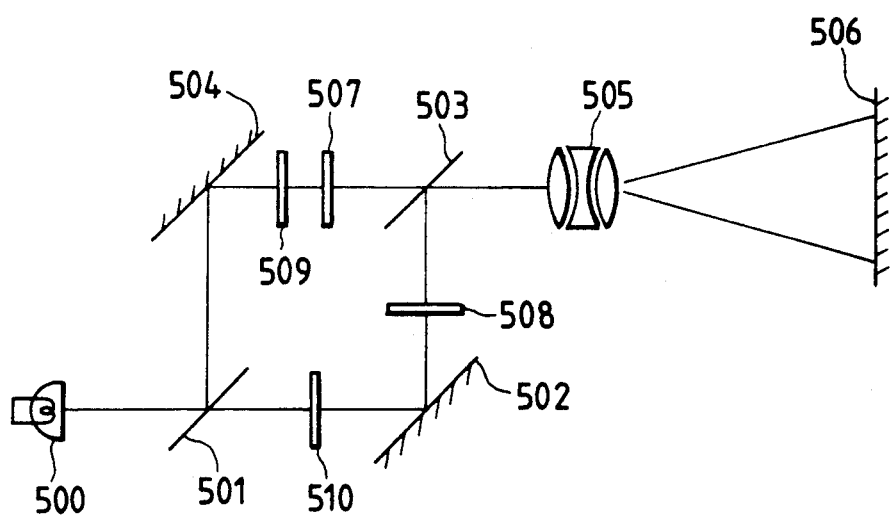
FIG. 26 is a view showing the structure of an embodiment in which the present invention is applied to a liquid crystal projection TV.

In FIG. 26, an image projector according to the present embodiment comprises a white light source 500, beam splitters 501 and 503, mirrors 502 and 504, a projection lens 505, a screen 506, liquid crystal panels 507 and 508, and half-wave plates 509 and 510. The parallel lights output from the white light source 500 is a randomly polarized light, and is separated by the beam splitter 501 into P wave and S wave. Then passing respectively through the half-wave plates 509 and 510 and the mirrors 502 and 504, these waves are modulated by the liquid crystal elements 507 and 508. After that, the S wave and P wave are synthesized by the beam splitter 503 and projected onto the screen 506 by the projection lens 505.

For the present embodiment, monochrome type liquid crystal elements 507 and 508 without color filters and color type liquid crystal elements with the three prime color filters R, G, and B, can be both employed Then, using both of the P wave and S wave, there is an effect that a bright image is obtainable as compared with the conventional method which uses one polarized light component.

Figure 27:
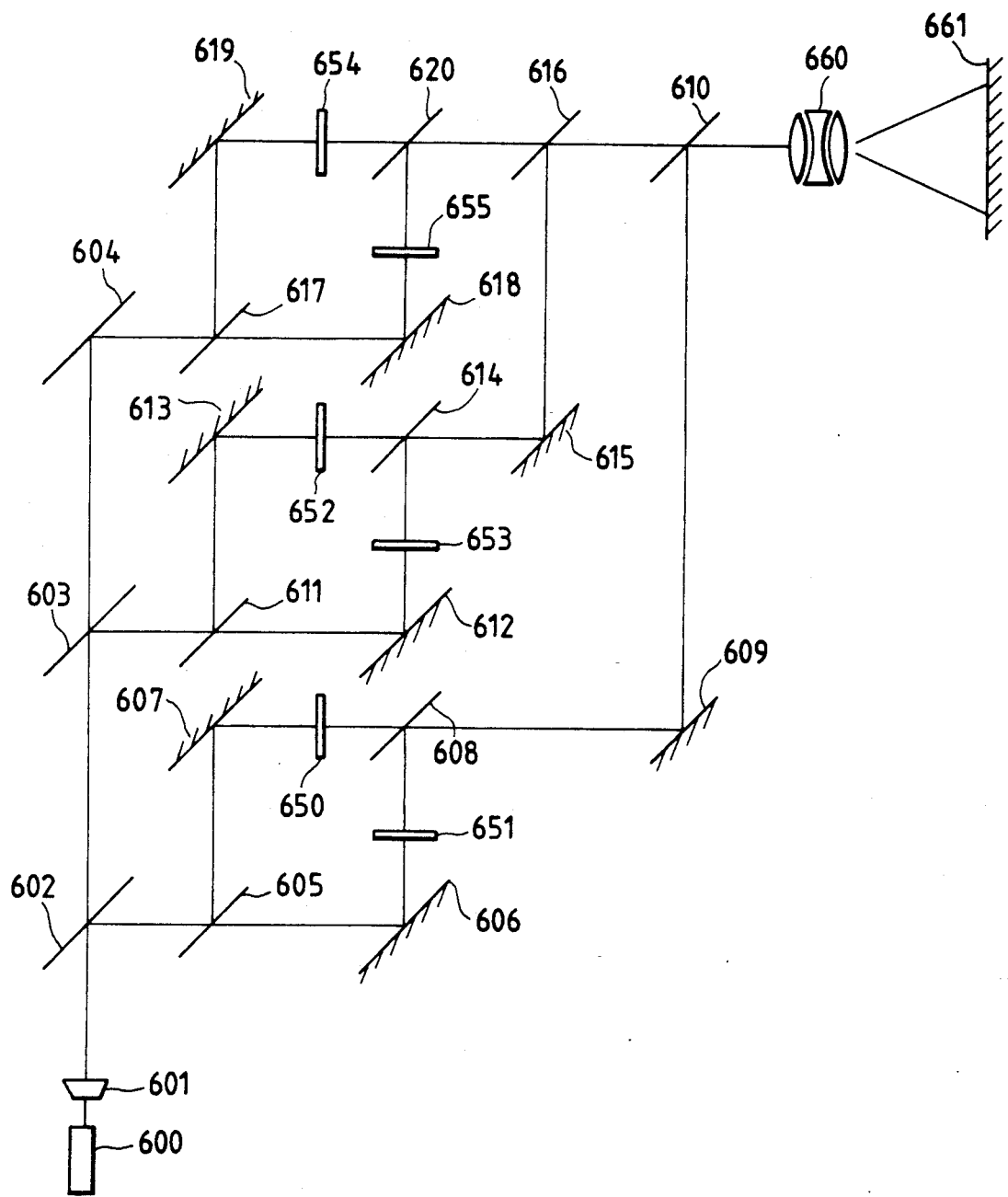
FIG. 27 is a view showing the structure of another embodiment of the liquid crystal projection TV.

FIG. 27 illustrates an embodiment in which a color image is projected with the liquid crystal elements which do not use any color filters.

In FIG. 27, a reference numeral 600 designates a white-laser or white-light source, and the light output therefrom is separated by dichroic mirrors 602, 603, and 604 into three wave lengths of R, G, and B after passing through a beam expander 601. The separated lights are further separated by the beam splitters 605, 611, and 617 into the P wave and S wave respectively, and are reflected by mirrors 606 and 607; 612 and 613; and 618 and 619. Subsequently, after passing through the liquid crystal masks 650 and 651; 652 and 653; 654 and 655 modulated by the images of the respective colors, these P and S wave are resynthesized for the respective colors by beam splitters 608, 614, and 620. Then, the light synthesized by the beam splitter 620 and the lights of the respective colors reflected by the mirrors 609 and 615 are synthesized by dichroic mirrors 616 and 610 and projected onto a screen 661 by a projection lens 660.

In the present embodiment, while the liquid crystal elements are as many as six pieces, there is an effect that a bright color image can be projected.

In this respect, in FIG. 27, half-wave plates are omitted for simplicity. Instead of using the white-laser or white-light source 600, it may be possible to employ a method in which the three-color lights of R, G, and B are directly incident on the beam splitters 605, 611, and 617.

As described above, the present invention is also applicable to the liquid crystal projection TV, and in those embodiments, the light is separated by the beam splitter into the S wave and P wave and both of them are utilized. Consequently there is produced an effect that a bright image is obtained as compared with the conventional method in which either one of the S wave or P wave is utilized. Particularly, when liquid crystal elements having three-color pixels provided by color filters are used, the brightness on the screen is two times that of conventional projection TVs by which good projection cannot be done because of its darkness. Therefore, as compared with the case where three liquid crystal elements for the three prime colors are employed, it is possible to provide an economical liquid crystal projection TV. In this respect, the display by the liquid crystal element is applicable both to a still picture and a moving one.

Advantages of an image reduction and enlargement projector, laser marker, and image projector according to the present invention are as follows:

(1) Since both of the separate polarized light components of P wave and S wave are used, the optical energy of the light source can be utilized fully for projecting an image in a reduced or enlarged form. Hence, an output of a high luminous intensity can be obtained.

(2) In the laser marker, it is possible to sufficiently utilize the laser light of a constant energy without being subjected to any influence even when a birefringence is generated in the laser rod due to a highly repeated oscillation, and marking for a large area is possible as in the case of the conventional method such as a metal mask method.

(3) In an image projector i.e., a liquid crystal projection TV, a bright image can be obtained because the luminous energy is not reduced by half.

(4) Since both of the P wave and S wave of the laser beam are used in a laser marker, the twistnematic type liquid crystal elements can be employed as the two image formation means for carrying information, making it possible to provide marking information electronically. As a result, the labor required for replacing, ordering, and controlling masks can be saved significantly.

(5) Since two liquid crystal elements are used, there is an advantage that the life of the liquid crystal mask is prolonged because the intensity of the beam passing through one set thereof is reduced. Accordingly, it is possible to extend the intervals for the maintenance services and replacements of the liquid masks as compared with conventional mask type markers.

(6) Whereas it is necessary for conventional liquid crystal type laser markers to construct its oscillator to perform the linearly polarized light output, the present invention enables an oscillator which outputs the randomly polarized light to be utilized as a laser oscillator. Therefore, with the present invention, the conventional mask type marker using the randomly polarized light output can be modified to a liquid crystal type marker with the electronic information display simply by modifying the optical path after the output.

(7) Since two liquid crystal elements are used, the quantity of light of a beam passing through a liquid crystal element can be half on the average of that of the conventional marker which uses only one liquid crystal element. Therefore, it is also possible to lower the expansion factor of the beam expander arranged on the light path in order to lower the intensity of the liquid crystal mask. Accordingly, there is an advantage (economical effect) that the lens, liquid crystal element, beam splitter, etc. which are employed can be made smaller.

(8) On the contrary, if the intensity of light of the beam passing through the liquid crystal mask is maintained at the same level as conventionally applied, the density of the beam becomes half on the average. Therefore, it becomes possible to omit the cooling device conventionally required for the liquid crystal elements or reduce the capacity of the cooling device. Consequently, there is a less possibility of generating dusty particles in the optical path, and the reliability of the apparatus is enhanced.

(9) Since there is no adverse effect by the birefringence, it is possible to increase the marking speed (the number of markings per second).

(10) The displays by two liquid crystal elements are made by one information source, and it is possible to form a synthesized image having a constant luminous intensity by synthesizing the P wave and S wave at all times. Consequently, a quality marking is possible.

(11) Two liquid crystal elements are adjustably assembled on an integrated base. As a result, it is possible to make the distances between the elements and the lens or the object almost equal so as to prevent any shift of the image formed.

(12) By the functions of the half-wave plates arranged on both paths of the P wave and S wave, it is possible to match the direction of polarization of the light carrying the information passing through the liquid crystal element exactly with the face of the beam splitter. In other words, the optical axis of the S wave is established to be in parallel with the face of the beam splitter while the P wave is established in the direction perpendicular thereto. Thus, the laser light is effectively utilized for marking.

(13) The display position is shifted electronically on the liquid crystal mask, so that the mechanical positioning of a liquid crystal can be performed with ease.

(14) By the use of the discarded beam, it is possible to position liquid crystal masks easily.

(15) There are other effects are mentioned in the descriptions of the embodiments.

We claim:

1. An apparatus for reducing, enlarging, and projecting image information comprising:
   a light source for radiating a light beam including at least P wave and S wave polarized light;
   means for separating the random light beam into P wave and S wave polarization components;
   means including at least two image information elements for providing both the two polarization components with the image information by modulating them;
   means for merging the P and S wave polarization components modulated by the image information; and
   means for projecting the resultant light to a workpiece for marking a pattern on it;
   wherein said apparatus further comprises at least two half-wave plates for controlling the directions of polarization of the light incident to said at least two image information elements.

2. An apparatus for reducing, enlarging, and projecting image information according to claim 1, wherein said light source is a laser oscillator for outputting a laser beam and said projecting means is a lens for focusing and marking the image informations of the resultant light beam on an object.

3. An apparatus for reducing, enlarging, and projecting image information according to claim 1, wherein said light source outputs a white light and said projecting means enlarges the image information of the resultant light beam and projecting them onto a screen.

4. An apparatus for reducing, enlarging, and projecting image information according to claim 1, wherein said image providing means includes at least a pair of twistnematic type liquid crystal arranged on the light path of the P wave polarization component and S wave polarization component of the light beam.

5. A laser marker comprising:
a laser oscillator for generating a laser beam;
a first beam splitter for separating the laser beam into P wave polarization component and S wave polarization component;
an image forming means including at least two image information elements arranged on the light path of the P wave polarization component and S polarization component for providing both the P wave polarization component and S wave polarization component with image information by modulating them;
a second beam splitter for merging the P and S wave polarization components modulated by the image information; and
a lens means for projecting the resultant light onto a workpiece so as to mark a pattern on it;
wherein the marker further comprises at least two half-wave plates for controlling the direction of polarization of the lights incident to said two image information elements.

6. A laser marker according to claim 5, wherein said image forming means are at least a pair of twistnematic liquid crystal elements.

7. A laser marker according to claim 5, wherein the distance between said pair of image forming means and lens means are approximately equal.

8. A laser marker according to claim 5, wherein said image formation means includes a common signal source for inputting signals to said two image formation elements.

9. A laser marker according to claim 5, wherein said image formation means includes means for presenting the displays of said two image formation elements in a mirror-image fashion electronically or mechanically, and said two image formation elements are liquid crystal elements arranged perpendicularly to each other.

10. A laser marker according to claim 5, wherein said laser oscillator outputs a laser beam of randomly polarized light.

11. A laser marker according to claim 5, wherein said second beam splitter is of a cubic type on which light can be incident from any direction.

12. A laser marker according to claim 5, wherein said second beam splitter is arranged in such a manner that the plane formed by the normal line of its face and by the optical axis is in parallel with or perpendicular to the axes of polarization of the modulated lights orthogonal to each other from said two image formation elements.

13. A laser marker according to claim 5, wherein said two half-wave plates are wave-plates for controlling the directions of polarization of the lights incident to said two image formation elements in such a manner as to be approximately equal.

14. A laser marker:
a laser oscillator for generating a laser beam;
a first beam splitter for separating the laser beam into P wave polarization component and S wave polarization component;
an image forming means including at least a pair of image information elements arranged on the light path of the P wave polarization component and S polarization component for providing both the P wave polarization component and S wave polarization component with image information by modulating them;
a second beam splitter for merging the P and S wave polarization components modulated by the image information; and
a lens means for projecting the resultant light onto a workpiece so as to mark a pattern on it;
wherein said image information means includes means capable of adjusting the relative positions of said two image information elements.

15. A laser marker comprising:
a laser oscillator for generating a laser beam;
a first beam splitter for separating the laser beam into P wave polarization component and a wave polarization component;
an image forming means including at least two image information elements arranged on the light path of the P wave polarization component and S polarization component for providing both the P wave polarization component and S wave polarization component with image information by modulating them;
a second beam splitter for merging the P and S wave polarization components modulated by the image information; and
a lens means for projecting the resultant light onto a workpiece so as to mark a pattern on it;
wherein said image forming means includes a common base which supports said two image information elements integrally and interchangeably, and the marker further comprises at least two half-wave plates for controlling the direction of polarization of the light incident to said two image information elements.

16. A laser marker comprising:
a laser oscillator for generating a laser beam;
a first beam splitter for separating the laser beam into P wave polarization component and S wave polarization component;
an image forming means including at least a pair of image information elements arranged on the light path of the P wave polarization component and S polarization component for providing both the P wave polarization component and S wave polarization component with image information by modulating them;
a second beam splitter for merging the P and S wave polarization components modulated by the image information; and
a lens means for projecting the resultant light onto a workpiece so as to mark a pattern on it;
wherein said marker further has a beam expander arranged on the light path before said first beam splitter.

17. A laser marker comprising:
a laser oscillator for generating a laser beam;
a first beam splitter for separating the laser beam into P wave polarization component and S wave polarization component;

an image forming means including at least a pair of image information elements arranged on the light path of the P wave polarization component and S polarization component for providing both the P wave polarization component and S wave polarization component with image information by modulating them;

a second beam splitter for merging the P and S wave polarization components modulated by the image information; and a lens means for projecting the resultant light onto a workpiece so as to mark a pattern on it;

wherein said marker further has capable of adjusting the positional shift of the images displayed by said two image information elements by detecting a discarded beam comprising the polarized components perpendicular to the lights modulated respectively by said two image information elements.

18. A laser marker comprising:

a laser oscillator for generating a laser beam;

a first beam splitter for separating the laser beam into P wave polarization component and S wave polarization component;

an image forming means including at least two image information elements arranged on the light path of the P wave polarization component and S polarization component for providing both the P wave polarization component and S wave polarization component with image information by modulating them;

a second beam splitter for merging the P and S wave polarization components modulated by the image information; and a lens means for projecting the resultant light into a workpiece so as to mark a pattern on it;

wherein said image forming means includes means for electronically controlling the positions of the images displayed on said two image information elements to correct a shift between the positions of both images, and the marker further comprises at least two half-wave plates for controlling the direction of polarization of the lights incident to said two image information elements.

19. A laser marker comprising:

a laser oscillator for generating a laser beam;

a first beam splitter for separating the laser beam into P wave polarization component and S wave polarization component;

an image forming means including at least a pair of image information elements arranged on the light path of the P wave polarization component and S polarization component for providing both the P wave polarization component and S wave polarization component with image information by modulating them;

a second beam splitter for merging the P and S wave polarization components modulated by the image information; and a lens means for projecting the resultant light onto a workpiece so as to mark a pattern on it;

wherein subsequent to the separation of the P wave and S wave by said first beam splitter, the lengths of the optical paths to said second beam splitter by which the resynthesization is performed are approximately equal.

20. A laser marker comprising:

a laser oscillator for generating a laser beam;

a first beam splitter for separating the laser beam into P wave polarization component and S wave polarization component;

an image forming means including at least a pair of image information elements arranged on the light path of the P wave polarization component and S polarization component for providing both the P wave polarization component and S wave polarization component with image information by modulating them;

a second beam splitter for merging the P and S wave polarization components modulated by the image information;

means for controlling he plane of polarization, the respective lights modulated by said two image information elements being directed to said second beam splitter with the plane of polarization of the lights perpendicular to each other;

a lens means for projecting the resultant light onto a workpiece so as to mark a pattern on it;

wherein said marker further comprises at least two half-wave plates for controlling the direction of polarization of the lights incident to said pair of image information elements.

21. A laser marker according to claim 20, wherein said polarization plane controlling means includes a half wave plate.

22. A laser marker comprising:

a laser oscillator for generating a laser beam;

a first beam splitter for separating the laser beam into P wave polarization component and S wave polarization component;

an image forming means including at least a pair of image information elements arranged on the light path of the P wave polarization component and S polarization component for providing both the P wave polarization component and S wave polarization component with image information by modulating them;

a second beam splitter for merging the P and S wave polarization components modulated by the image information;

means for controlling the plane of polarization, the respective lights modulated by said two image information elements being directed to said second beam splitter with the plane of polarization of the lights perpendicular to each other;

a lens means for projecting the resultant light onto a workpiece so as to mark a pattern on it;

wherein said polarization controlling means includes a pair of image formation elements for displaying a negative image on one side and a positive image on the other side.

23. A laser marker according to claim 22, wherein said displaying means includes an inverting circuit for inverting signals inputted to one of the image formation elements.

24. An image projector comprising:

a light source for outputting randomly polarized light;

a first beam splitter for separating said light into the P wave and S wave;

an image formation means including at least two liquid crystal elements which modulate said P wave and S wave respectively to provide them with image information;

a second beam splitter for resynthesizing the P wave and S wave provided with said information; and a projection lens for projecting said light obtained by the resynthesization onto a screen;

wherein said projector further comprises at least two half-wave plates for controlling the direction of polarization of the lights incident to said two liquid crystal elements.

25. An image projector according to claim 24, wherein said light source is means for outputting white light randomly polarized, and said two image formation elements are of the pixel structure having at least two colors or more of the three prime colors, R, G, and B, to enable the projection of a color image.

26. An image projector according to claim 24, wherein the image information provided by said liquid crystal element is the image information of a moving picture.

27. A color image projector comprising:

a light source for outputting white light randomly polarized;

a first plurality of dichroic mirrors for performing the color separation of said white light;

an optically processing means, which is arranged on the respective beam lines of the respective colors provided by said color separation, for providing image information to the lights of the respective colors;

a second plurality of dichroic mirrors for resynthesizing the color lights provided with said image information; and a projection lens for projecting said synthesized light; and characterized in that said optically processing means comprises a first beam splitter for separating the respective color lights into the polarized light components of both P wave and S wave;

an image formation means including at least two liquid crystal elements for modulating said P wave and S wave respectively to provide them with an image information; and a second beam splitter for resynthesizing the P wave and S wave provided with said image information.

28. A color image projector according to claim 27, wherein the image information provided by said liquid crystal elements is the image information of a moving picture.

29. A color image projector according to claim 27, wherein the light incident to the optically processing means corresponding to each of said colors is one colored and randomly polarized.

* * * * *